US012077663B2

(12) United States Patent
Wang et al.

(10) Patent No.: US 12,077,663 B2
(45) Date of Patent: Sep. 3, 2024

(54) POLYOL POLYESTER AND POLYHYDROXY ALKANE BLENDS WITH POLAR POLYMERS

(71) Applicant: TRINSEO EUROPE GMBH, Horgen (CH)

(72) Inventors: Jing-Han (Helen) Wang, King of Prussia, PA (US); Cecile Bonnet, Norristown, PA (US); Alex Pederson, Owatonna, MN (US)

(73) Assignee: Trinseo Europe GmbH, Pfaeffikon (CH)

( * ) Notice: Subject to any disclaimer, the term of this patent is extended or adjusted under 35 U.S.C. 154(b) by 964 days.

(21) Appl. No.: 16/962,278

(22) PCT Filed: Jan. 4, 2019

(86) PCT No.: PCT/US2019/012241
§ 371 (c)(1),
(2) Date: Jul. 15, 2020

(87) PCT Pub. No.: WO2019/143481
PCT Pub. Date: Jul. 25, 2019

(65) Prior Publication Data
US 2020/0354560 A1  Nov. 12, 2020

Related U.S. Application Data

(60) Provisional application No. 62/617,700, filed on Jan. 16, 2018.

(51) Int. Cl.
| | | |
|---|---|---|
| C08K 5/053 | (2006.01) | |
| B32B 27/08 | (2006.01) | |
| B32B 27/18 | (2006.01) | |
| B32B 27/30 | (2006.01) | |
| B32B 27/36 | (2006.01) | |
| C08K 5/101 | (2006.01) | |
| C08L 33/10 | (2006.01) | |
| C08L 33/12 | (2006.01) | |
| C08L 33/20 | (2006.01) | |
| C08L 91/06 | (2006.01) | |

(52) U.S. Cl.
CPC .............. *C08L 33/12* (2013.01); *B32B 27/08* (2013.01); *B32B 27/18* (2013.01); *B32B 27/304* (2013.01); *B32B 27/308* (2013.01); *B32B 27/36* (2013.01); *C08K 5/053* (2013.01); *C08K 5/101* (2013.01); *C08L 33/20* (2013.01); *C08L 91/06* (2013.01); *B32B 2270/00* (2013.01); *B32B 2305/72* (2013.01); *B32B 2307/406* (2013.01)

(58) Field of Classification Search
None
See application file for complete search history.

(56) References Cited

U.S. PATENT DOCUMENTS

| | | | | |
|---|---|---|---|---|
| 3,817,900 A | * | 6/1974 | Higuchi | ............... C08K 5/1515 524/378 |
| 3,983,263 A | * | 9/1976 | Weiss | ....................... C09D 7/47 427/195 |
| 4,064,092 A | | 12/1977 | Burroway et al. | |
| 4,131,580 A | | 12/1978 | Emmons et al. | |
| 4,743,641 A | * | 5/1988 | Shizawa | .................. C08K 5/05 524/611 |
| 4,871,814 A | | 10/1989 | Gunesin et al. | |
| 5,527,869 A | * | 6/1996 | Fuchigami | ............. C08K 5/103 524/487 |
| 5,731,377 A | | 3/1998 | Friel | |
| 6,027,800 A | | 2/2000 | Sheu | |
| 7,183,005 B2 | | 2/2007 | Poloso et al. | |
| 7,841,746 B2 | | 11/2010 | Kamijima | |
| 7,842,746 B2 | | 11/2010 | Bloom et al. | |
| 2002/0009607 A1 | | 1/2002 | Nishimura et al. | |
| 2007/0151480 A1 | | 7/2007 | Bloom et al. | |
| 2008/0103340 A1 | | 5/2008 | Binder et al. | |
| 2016/0009915 A1 | | 1/2016 | Sun et al. | |

(Continued)

FOREIGN PATENT DOCUMENTS

| | | |
|---|---|---|
| CN | 106068305 A | 11/2016 |
| EP | 1109861 B1 | 1/2005 |

(Continued)

OTHER PUBLICATIONS

Chinese Office Action for Chinese Application No. 201980008424. 3, dated Dec. 3, 2021 with translation, 21 pages.
Extended European Search Report for European Application No. 19 741 186.1, dated Sep. 30, 2021, 10 pages.
European Examination Report for European Application No. 19 741 186.1, dated Sep. 5, 2023, 8 pages.
Japanese Notice of Reasons for Refusal for Japanese Application No. 2020-539049, dated Nov. 15, 2022 with translation, 8 pages.

*Primary Examiner* — David J Buttner
(74) *Attorney, Agent, or Firm* — Buchanan Ingersoll & Rooney PC

(57) ABSTRACT

Compounds that can be produced by a ring-opening reaction of epoxidized alkanes or epoxidized fatty acid esters having a molecular weight greater than 200 grams per mole are blended with polar polymers to improve the gloss of the polar polymers. These compounds include at least one polar functional group and are blended with polar polymers, or blends comprising at least one polar polymer, in order to improve the gloss of these polymers, such that they have suitable gloss right out of the manufacturing operation without the need for further painting or lamination steps. These compounds may also improve the impact strength of the polar polymers. Also disclosed are composite structures wherein an outer cap layer is made from the polar polymer blended with the gloss improving additive.

13 Claims, 1 Drawing Sheet

(56) References Cited

U.S. PATENT DOCUMENTS

2016/0200895 A1    7/2016   Lipscomb et al.
2017/0233565 A1    8/2017   Krishnaswamy

FOREIGN PATENT DOCUMENTS

| KR | 100960589 B1 | 6/2010 |
|----|--------------|--------|
| WO | 2008151286 A1 | 12/2008 |
| WO | 2016098344 A1 | 6/2016 |
| WO | 2016201687 A1 | 12/2016 |

\* cited by examiner

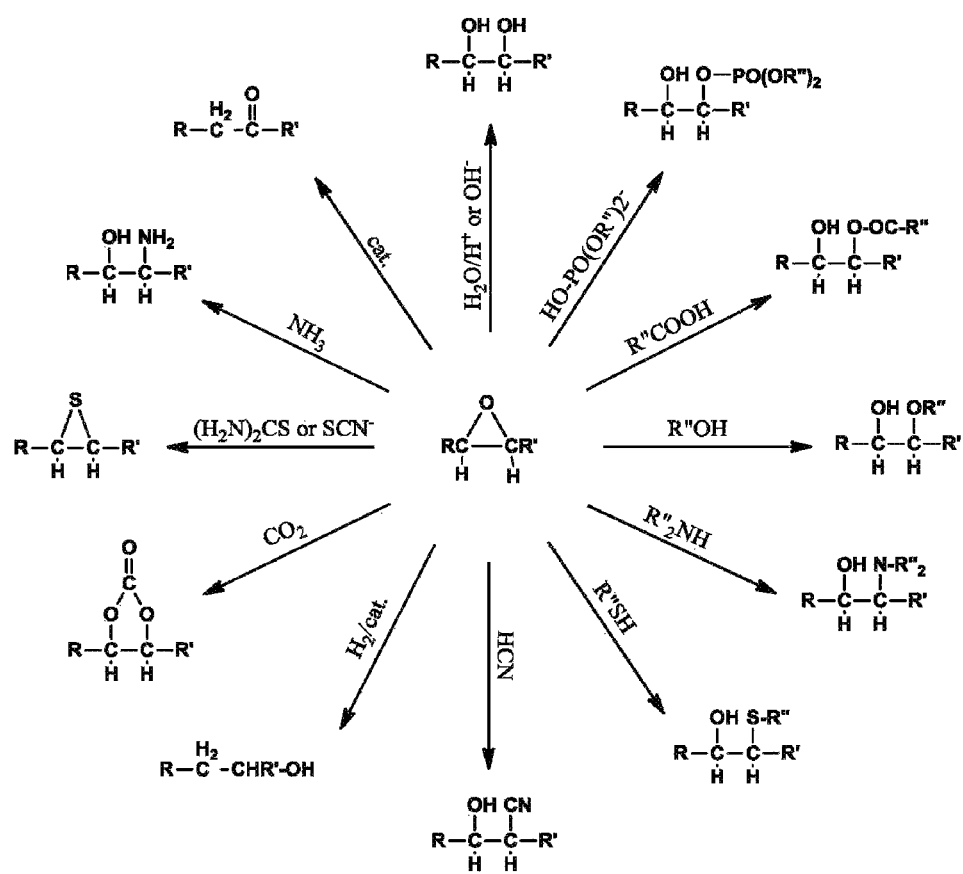

POLYOL POLYESTER AND POLYHYDROXY ALKANE BLENDS WITH POLAR POLYMERS

This application claims benefit, under U.S.C. § 119 or § 365 of PCT Application Number PCT/US2019/012241, filed Jan. 4, 2019; and U.S. Provisional Applications No. 62/617,700, filed Jan. 16, 2018; said applications incorporated herein by reference.

FIELD OF THE INVENTION

Compounds that can be prepared by a ring-opening reaction of epoxidized alkanes or epoxidized fatty acid esters having a weight average molecular weight greater than 200 grams per mole are blended with polar polymers to improve the gloss of the polar polymers. These compounds comprise at least one and preferably two polar functional groups per molecule and are blended with polar polymers, or blends comprising at least one polar polymer, in order to improve the gloss of these polymers, such that the polymers have suitable gloss right out of the manufacturing operation without the need for further painting or lamination steps. These compounds also improve or, at minimum do not degrade, the impact strength of the polar polymers. Preferred compounds are polyol polyesters and/or polyhydroxy (e.g., dihydroxy) alkanes that can be prepared by the ring-opening reactions of the corresponding epoxidized compound. These polar polymer blends with the polyol polyesters and/or the dihydroxy alkanes are particularly suitable to be used as the surface layer, cap layer or capstock layer of a structure, e.g., as the outer layer of an extruded profile that is intended to be used in outdoor locations (i.e., where good weatherability is a desirable characteristic). The polyol polyesters and/or polyhydroxy alkanes are blended into the polar polymers at levels higher than typically achievable with currently available lubricants (for example, up to 40 weight percent on the basis of the polymer). These additives were found to also improve or at least not to deteriorate the impact strength of the polar polymers, which also contributes to their suitability as capstock layers in a multi-layered structure.

BACKGROUND OF THE INVENTION

Acrylic polymers, and derivatives and copolymers of acrylic polymers, have many desirable characteristics, particularly excellent weatherability (good UV resistance), protection of an underlying substrate from UV as well as resistance to scratching that make them attractive to use for such applications as the outer cap layer or capstock layer on extruded profile that can be used in exterior locations, e.g., window profiles. Other applications of these materials as the outer or capstock layer include, but are not limited to, the automotive industry; recreational vehicles; aircraft; farm machinery; building and construction; outdoor recreational equipment; water sports; pools; lawn and garden equipment; and outdoor structural applications requiring stiffness and strength, such as decking, rails, posts, siding, fencing, and structures, and outdoor structural applications (windows, siding, decking, railings, shutters); communication devices such as telephones, radio, TV, cassettes, etc.; power tools; appliances; business machines; toys; furniture; and medical devices. Other suitable polymers for these capstock layers are, for example, polyvinylidene fluoride (PVDF) polymers.

However, these materials tend to suffer from being less glossy than the painted or laminated outer layers that are currently used on these structures. Elimination of the painting or lamination step in the manufacture of these products has significant potential for materials cost and time savings for the manufacturing operation. Consequently, it would be desirable to provide an additive that has excellent compatibility with these materials and that would result in a structure having a cap layer that would be sufficiently glossy right out of the manufacturing operation without the need for further painting or lamination steps.

It is known that lubricants decrease surface friction on capstock resins during processing, which tends to improve the surface gloss of the finished product. However, common lubricants, for instance stearic acid and stearyl alcohol, are quite volatile at typical processing temperatures (200-240° C.). In addition, at levels that improve gloss (>2%), these additives tend to leave waxy residues and plate-out in the process equipment (calibrator, dies, etc.) that decrease the quality (smoothness and uniformity) of the capstock layer.

Therefore, there is a need for an additive that could be added to these capstock resins at sufficiently high levels to improve gloss and that would provide a good quality cap layer that has high gloss, while maintaining the desirable weatherability and impact resistance characteristics of these resins and simultaneously resisting plate-out and waxy deposits on processing equipment.

SUMMARY OF THE INVENTION

The invention relates to blends of polar polymers with compounds that can be prepared as the product of the ring-opening reaction of epoxidized alkanes or epoxidized fatty acid esters having a molecular weight greater than 200 grams per mole. These compounds, when blended with polar polymers, improve the gloss of the polar polymers. These compounds comprise at least one polar functional group and are blended with polar polymers, or blends comprising at least one polar polymer in order to improve the gloss of these polymers, such that they have suitable gloss right out of the manufacturing operation without the need for further painting or lamination steps. These compounds can also improve the impact strength of the polar polymers.

Preferred such gloss improving compounds can be conveniently made as the product of the ring-opening reaction of epoxidized alkanes or epoxidized fatty acid triglycerides having a molecular weight greater than 200 grams per mole. Examples of such compounds are polyol polyesters and/or dihydroxy alkanes and they function as gloss improving additives. Other products of ring opening reactions of epoxidized alkanes or epoxidized fatty acid triglycerides having a molecular weight greater than 200 grams per mole and comprising at least one polar group are also suitable as gloss improving additives. It is worth emphasizing that while these materials are conveniently described as the products of ring-opening reactions of epoxidized alkanes or epoxidized fatty acid triglycerides, it is not necessary that they be made in that way.

The polar polymers are preferably acrylic polymers, acrylonitrile polymers, and blends and copolymers thereof. Other suitable resins are polyvinyl chlorides (PVC), polycarbonates (PC), polyurethanes (PU), thermoplastic polyurethanes (TPU) and polyesters, as well as fluoropolymers, e.g. polyvinylidene fluoride polymer (PVDF). The addition of these products of the ring-opening reaction of epoxidized alkanes or epoxidized fatty acid triglycerides improves the surface gloss of these polar polymers without the need for a painting or lamination step. Additionally, these gloss improving additives can improve the impact strength of these materials when they are used as the outer cap layer of a composite structure. Importantly, these additives do not degrade the excellent weatherability that is a critical parameter in the use of these polymer materials as a capstock for composite structures that are intended for outdoor use.

The term "polyol polyester" as used herein refers to an organic compound containing two or more hydroxyl groups per molecule and two or more ester groups per molecule. The polyol polyesters are preferably molecules that can be the product of the ring-opening reaction of epoxidized fatty acid triglycerides with aqueous acid or base which produces two vicinal hydroxyl groups for each epoxy group. Preferred polyol polyester molecules have a molecular weight of at least 200 grams per mole.

The dihydroxy alkanes are preferably molecules that can be made by the ring-opening reaction of epoxidized alkenes with aqueous acid or base which produces two vicinal hydroxyl groups for each epoxy group. Preferred molecules are 1,2-dihydroxy aliphatic alkanes having a molecular weight of at least 200 grams per mole.

The term, "fatty acid ester" refers to compounds that result from the reaction of an alcohol with a fatty acid. They can be fatty acid monoesters, fatty acid monoglycerides, fatty acid diglycerides, fatty acid triglycerides, and fatty acid esters of polyols.

The invention also relates to a multilayer composite structure that can be used in building and construction; outdoor recreational equipment; water sports; pools; marine applications, lawn and garden equipment; and outdoor structural applications such as decking, rails, posts, siding, fencing, structures and window profiles; the automotive industry; recreational vehicles; aircraft; farm machinery; communication devices such as telephones, radio, TV, cassettes, etc.; power tools; appliances; business machines; toys; furniture; medical devices, as non-limiting examples of potential uses. Other applications are sheets made from the multilayer composite material that are suitable for thermoforming.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Various non-limiting aspects of the invention may be summarized as follows:

Aspect 1: A composition comprising:
   a) at least one polar polymer;
   b) at least one gloss improving additive having a molecular weight above 200 grams per mole,
      wherein the at least one gloss improving additive is selected from the group consisting of functionalized straight chain alkanes, functionalized branched alkanes, functionalized fatty acid esters and mixtures thereof; wherein the at least one gloss improving additive is comprised of at least one functional group selected from the group consisting of vicinal diol, hydroxy phosphotriester, hydroxy ester, hydroxy ether, hydroxy amino, hydroxy sulfide, hydroxy nitrile, hydroxy amine, terminal alcohol, thiiran, ketone and cyclic carbonate.

Aspect 2: The composition according to aspect 1, wherein the composition comprises at least one straight chain or branched hydroxyalkane comprising at least one vicinal diol group.

Aspect 3: The composition according to any of aspects 1 or 2 wherein the at least one straight chain or branched hydroxyalkane is a 1,2-dihydroxy alkane.

Aspect 4: The composition according to any of aspects 1-3, wherein the composition comprises at least one fatty acid ester having a weight average molecular weight above 200 grams per mole and comprising at least two hydroxyl groups, wherein the fatty acid ester is derived from a vegetable or animal oil.

Aspect 5: The composition according to any of aspects 1-4, wherein the fatty acid ester comprising at least two hydroxyl groups derived from a vegetable or animal oil is a reaction product of an epoxidized vegetable or animal oil with at least one of an aqueous acid or an aqueous base.

Aspect 6: The composition according to either of aspects 4 or 5 wherein the epoxidized vegetable or animal oil is selected from the group consisting of epoxidized algae oil, epoxidized canola oil, epoxidized coconut oil, epoxidized castor oil, epoxidized corn oil, epoxidized cottonseed oil, epoxidized flax oil, epoxidized fish oil, epoxidized grapeseed oil, epoxidized hemp oil, epoxidized jatropha oil, epoxidized jojoba oil, epoxidized mustard oil, epoxidized canola oil, epoxidized palm oil, epoxidized palm stearin, epoxidized rapeseed oil, epoxidized safflower oil, epoxidized soybean oil, epoxidized sunflower oil, epoxidized tall oil, epoxidized olive oil, epoxidized tallow, epoxidized lard, epoxidized chicken fat, epoxidized linseed oil, epoxidized tung oil, epoxidized linseed oil, epoxidized tung oil and mixtures thereof.

Aspect 7: The composition according to any of aspects 1-6, wherein the composition is comprised of between 2 and 40 weight percent of the gloss modifying additive, based on the weight of the polar polymer.

Aspect 8: The composition according to any of aspects 1-7, wherein the composition has a 75 degree gloss as measured using a BYK Gardner Micro-Gloss 75 degree Gloss Meter and a 60 degree gloss as measured using a BYK Gardner Micro-Tri-Gloss 20/60/85 degree Gloss Meter, wherein the 75 degree gloss is 53 or greater and the 60 degree gloss is 12 or greater.

Aspect 9: The composition according to any of aspects 1-8, further comprising an impact improving additive.

Aspect 10: The composition according to aspect 9, wherein the impact improving additive is selected from the group consisting of linear block copolymers, core shell polymers, and mixtures thereof.

Aspect 11: The composition according to either of aspects 9 or 10, wherein the composition is comprised of between 20 and 60 weight percent of the impact improving additive, based on the weight of the polar polymer.

Aspect 12: The composition according to any of aspects 1-11, wherein the polar polymer comprises at least one polymer selected from acrylic polymers, acrylonitrile polymers, polyvinyl chlorides (PVC), polycarbonates (PC), polyurethanes (PU), thermoplastic polyurethanes (TPU), polyesters, polyethylene terephthalate (PET), polyethylene naphthalate (PEN), polybutylene terephthalate (PBT), glycol-modified polyester (PETG), fluoropolymers, or copolymers thereof, or mixtures thereof.

Aspect 13: The composition according to any of aspects 1-12 wherein the at least one polar polymer is an acrylic polymer or acrylonitrile polymer and comprises a homopolymer, a co-polymer, a terpolymer or a mixture thereof.

Aspect 14: The composition according to any of aspects 1-13, wherein the polar polymer comprises, in polymerized form, at least one monomer selected from the group consisting of methyl methacrylate, methyl acrylate, ethyl acrylate, ethyl methacrylate, butyl acrylate, butyl methacrylate, iso-octyl methacrylate, iso-octyl acrylate, lauryl acrylate, lauryl methacrylate, stearyl acrylate, stearyl methacrylate, isobornyl acrylate, isobornyl methacrylate, methoxy ethyl acrylate, methoxy ethyl methacrylate, 2-ethoxy ethyl acrylate, 2-ethoxy ethyl methacrylate, dimethylamino ethyl acrylate, dimethylamino ethyl methacrylate, acrylonitrile, vinyl cyanide compounds, polar derivatives of styrene, and mixtures thereof.

Aspect 15: The composition according to any of aspects 1-14, wherein the polar polymer is an acrylic polymer which is a copolymer of methyl methacrylate and 2 to 16 percent by weight of one or more C1-C4 acrylates.

Aspect 16: A multilayer composite structure comprising:
 a) at least one capstock layer comprising the composition according to claim 1; and
 b) at least one substrate layer,
 wherein the multilayer composite structure comprises an outer layer and an inner layer, wherein the outer layer has an external surface, and wherein the capstock layer is the outer layer and the substrate layer is the inner layer.

Aspect 17: The multilayer composite structure according to aspect 16, wherein the substrate layer comprises at least one polymer selected from acrylic polymers, styrenic polymers, polyolefins, polyvinyl chlorides (PVC), polycarbonates (PC), polyurethanes (PU), styrene-acrylonitrile (SAN) copolymers, acrylonitrile butadiene styrene (ABS) polymers, methylmethacrylate acrylonitrile butadiene styrene (MABS) copolymers, acrylonitrile styrene acrylate (ASA) copolymers, high-impact polystyrenes (HIPS), wood/polymer composites, polyesters or mixtures thereof.

Aspect 18: The multilayer composite structure according to either of aspects 16 or 17, wherein the capstock layer has a 75 degree gloss as measured using a BYK Gardner Micro-Gloss 75 degree Gloss Meter and a 60 degree gloss as measured using a BYK Gardner Micro-Tri-Gloss 20/60/85 degree Gloss Meter, wherein the 75 degree gloss is 53 or greater and the 60 degree gloss is 12 or greater.

Aspect 19: The multilayer composite structure according to any of aspects 16-18, wherein the capstock layer has a mean fracture energy (MFE) impact strength measured by the Gardner Impact Test with conical tip and wherein the MFE impact strength is at least 0.7 in-lb/mil.

Aspect 20: A composition comprising:
 a) at least one polar polymer;
 b) at least one gloss improving additive,
 wherein the at least one gloss improving additive is selected from the group consisting of hydroxyalkanes comprising at least two hydroxyl groups and having a molecular weight above 200 grams per mole, polyol polyesters comprising at least two hydroxyl groups and having a molecular weight above 200 grams per mole, and mixtures thereof.

BRIEF DESCRIPTION OF THE DRAWINGS

FIG. 1 is a schematic showing possible reaction products of the ring-opening reaction of epoxides that may be used in accordance with certain embodiments of the invention.

DETAILED DESCRIPTION OF THE INVENTION

The invention relates to blends of polar polymers with a gloss improving additive. These compounds are conveniently described as the product of the ring-opening reaction of epoxidized alkanes or fatty acid esters having a molecular weight greater than 200 grams per mole. It is worth emphasizing that while these molecules may be conveniently described as the reaction product of ring opening reactions of the corresponding epoxidized compound, they may be prepared by any other method as known in the art.

The gloss and additive preferably comprises linear or branched alkane polyols having a molecular weight greater than 200 grams per mole. The gloss improving additive may also comprise polyol polyesters having a molecular weight greater than 200 grams per mole. Such polyol polyesters can be produced from a ring-opening reaction of the corresponding epoxidized fatty acid triglycerides. A mixture of these molecules may also be used as the gloss improving additive as described herein.

The invention also relates to multilayered composite structures in which the blends of polar polymers with a gloss improving additive are the outer or capstock layer, covering a substrate layer that may be polymeric or may not be polymeric.

Unless otherwise indicated, all percentages herein are weight percentages, and all polymer molecular weights are weight average molecular weights measured by gel permeation chromatography (GPC).

"Polymer" as used herein, is meant to include organic molecules with a weight average molecular weight higher than 20,000 g/mol, preferably higher than 50,000 g/mol, as measured by gel permeation chromatography.

Molecular weight of the alkane diols or polyols or other such molecules that can be prepared by the ring-opening reaction of epoxidized vegetable or animal oils as described herein refers to the molecular weight in grams per mole, as calculated based on the structure of the molecule. It is understood that these materials comprise a range of molecular weight and that the molecular weight recited herein is an estimate only.

Molecular weight of the polyol polyesters or other such molecules that can be prepared by the ring-opening reaction of epoxidized vegetable or animal oils as described herein refers to the molecular weight in grams per mole, as calculated based on the structure of the molecule. It is understood that these materials comprise a range of molecular weight and that the molecular weight recited herein is an estimate only.

Gloss Improving Additives

In general, suitable gloss improving additives comprise compounds having a molecular weight greater than 200 grams per mole and at least one and preferably at least two polar functional groups per molecule. These compounds can be incorporated into the capstock polymer at levels up to 40% by weight of the capstock polymer.

These gloss improving additives may be blended into the polar polymers using any of the methods known in the art. Non-limiting examples include directly mixing into a final blend, with or without other additives; making a masterbatch comprising up to 40 weight percent of the gloss improving additive and subsequently diluting the masterbatch as appropriate; or feeding the additive directly into the extruder during production of an extruded part.

These compounds may be manufactured by any suitable method known in the art, but are conveniently synthesized by epoxidizing suitable unsaturated molecules and then subjecting the resulting epoxy groups to reagents and conditions to open the epoxide ring(s).

In general, suitable gloss additives comprise polyols having a molecular weight greater than about 200 grams per mole and comprising at least one hydroxyl group per molecule.

Especially preferred additives are polyols that are the product of epoxy ring-opening reactions using either aqueous acid or base with epoxidized straight chain or branched alkanes or epoxidized fatty acid esters. Such molecules will comprise at least one, or more, pairs of vicinal hydroxyl groups. Particularly preferred fatty acid esters as starting materials are epoxidized fatty acid triglycerides. Also particularly preferred as starting materials are straight chain aliphatic epoxidized alkanes having the epoxy group in the terminal position. Branched epoxidized alkanes are also suitable starting materials.

Non-limiting examples of these compounds are:

1,2 dihydroxy alkanes with a molecular weight above 200 grams per mole, sold as Vikinol® by Arkema or vegetable oil polyols having a molecular weight above 200 grams per mole sold by Arkema.

It is to be understood, particularly in the case of the vegetable oil-derived polyols, that these are natural products and that therefore they comprise a range of molecular weights and structures, and are not necessarily comprised only of triglycerides—they may also comprise mono-, di-, or higher order glycerides as well as a range of hydroxyl values from 1-400 mg KOH/g (milligrams of potassium hydroxide per gram of sample). Likewise, the 1,2 dihydroxyalkanes comprise a range of molecular weights and may also have a range of hydroxyl values from 1-400 mg KOH/g. Hydroxyl values are measured according to AOCS (American Oil Chemists' Society) Method Tx 1a-66.

Non-limiting examples of suitable epoxidized fatty acid triglycerides as starting materials for epoxide ring opening reactions that produce the gloss improving additives are: epoxidized algae oil, epoxidized canola oil, epoxidized coconut oil, epoxidized castor oil, epoxidized corn oil, epoxidized cottonseed oil, epoxidized flax oil, epoxidized fish oil, epoxidized grapeseed oil, epoxidized hemp oil, epoxidized jatropha oil, epoxidized jojoba oil, epoxidized mustard oil, epoxidized canola oil, epoxidized palm oil, epoxidized palm stearin, epoxidized rapeseed oil, epoxidized safflower oil, epoxidized soybean oil, epoxidized sunflower oil, epoxidized tall oil, epoxidized olive oil, epoxidized tallow, epoxidized lard, epoxidized chicken fat, epoxidized linseed oil, epoxidized tung oil, epoxidized linseed oil, epoxidized tung oil and mixtures thereof. It is to be understood that complete epoxidation of these compounds is not necessary in the practice of the invention, nor is complete ring-opening of the epoxidized compound(s). Hydroxyl values ranging from 1-400 mg KOH/g are suitable.

The products of other ring-opening reactions of epoxidized straight chain or branched alkanes or epoxidized fatty acid esters, particularly epoxidized fatty acid triglycerides, are also suitable as gloss improving additives, as shown in FIG. 1.

FIG. 1 shows the ring-opening reactions of the epoxide groups on these epoxidized molecules that produce the compounds that can be used as gloss improving additives for polar polymers. The resulting molecules comprise at least one polar group for each epoxide ring that was present on the corresponding epoxidized molecule. Generally, most have a hydroxyl group adjacent to (separated by two carbon atoms from) a second polar group such as: a second hydroxyl group, phosphotriester, ester, ether, amino, sulfide, nitrile, or amine, depending on the reactants. These can be referred to as vicinal diols, hydroxy phosphotriesters, hydroxy ester, hydroxy ether, hydroxy amino, hydroxy sulfide, hydroxy nitrile, or hydroxy amine, respectively. Other groups that do not have an adjacent hydroxyl group are: terminal alcohol, ketone, thiiran or cyclic carbonate.

Also suitable for use as gloss improving additives are molecules that can be conveniently described as products of partially opened epoxy rings resulting from the reaction of epoxidized straight chain or branched alkanes or fatty acid esters with acids or alcohols. These are shown as the intermediates in the reactions disclosed in U.S. Pat. No. 9,686,918, which is incorporated by reference herein in its entirety for all purposes.

Also suitable for use as gloss improving additives are the molecules that can be conveniently described as the products of partially opened epoxy rings resulting from the reaction of epoxidized straight chain or branched alkanes or fatty acid esters with a carboxylic acid (particularly a short chain carboxylic acid such as acetic acid), which results in the hydroxy ester shown below:

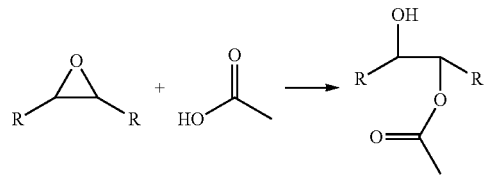

It is to be understood that blends of these gloss improving additives in all proportions are considered to be part of the invention. Also part of the invention are blends of ranges of these compounds. Non-limiting examples are, for instance, blends of a range of molecular weights of 1,2 dihydroxy alkanes and/or blends of various functionalized vegetable or animal oil derivatives as described above.

Polar Polymers as Outer Capstock or Cap Layer

The gloss improving additives as discussed above are combined with polar thermoplastic polymers that are intended to be used as the outer capstock or cap layer of, a multilayer composite structure. A non-limiting example of such a structure is extruded profile, comprising an inner (or lower) substrate layer and on outer (or upper) capstock layer, according to exemplary aspects of this disclosure. The thickness of the capstock layer is preferably from 1 mil to 100 mil thick, preferably from 3 mil to 25 mil thick and more preferably from 4 mil to 20 mil thick.

Such polar thermoplastic polymers useful in the present invention as a cap layer with which the gloss improving additive is combined include, but are not limited to, polar polymers or polymers that have been modified to comprise polar groups, e.g., through such processes as grafting after polymerization. Copolymers comprising at least one polar monomer are suitable to have the gloss improving modifiers combined with them. As discussed above, up to 40% of the gloss improving additive by weight of the polymer can be combined with the capstock polymer.

Such thermoplastic polymers, having improved gloss when combined with the gloss improving ingredient, include, but are not limited to acrylic polymers and copolymers, acrylonitrile polymers and copolymers, polyvinyl chlorides (PVC), polycarbonates (PC), polyurethanes (PU), thermoplastic polyurethanes (TPU), or polyesters or copolymers thereof, fluoropolymers, or mixtures thereof. Non-polar monomers, such as alkenes, styrenes and the like are suitable as co-monomers, as long as at least one comonomer comprises a polar moiety (such as an ester, cyano, urethane, haloalkyl, or carbonate moiety, for example). Likewise, blends of polar polymers or copolymers with nonpolar polymers are also considered to be within the realm of the invention.

Acrylic polymers, as used herein, include but are not limited to homopolymers, copolymers, and terpolymers comprising alkyl (meth)acrylates.

The alkyl methacrylate monomer is preferably methyl methacrylate, which may make up from 60 to 100% by weight of the monomer mixture. Zero to 40 percent by weight of other acrylate, methacrylate, and/or other vinyl monomers may also be present in the monomer mixture. Other methacrylate, acrylate, and other vinyl monomers, e.g., vinyl cyanide monomers and acrylonitrile, useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives, acrylonitrile, and vinyl cyanides. Small levels of multifunctional monomers as crosslinking agents may also be used. A preferred acrylic polymer is a copolymer of methyl methacrylate and 2-16 percent by weight of one or more C1-4 acrylates.

Acrylonitrile polymers can also be used in the capstock layer. Acrylonitrile polymers, as used herein include but are not limited to, homopolymers, copolymers or terpolymers comprising acrylonitrile or methacrylonitrile and various other monomers. About 20 to 85 percent by weight of the copolymer is acrylonitrile or methacrylonitrile and about 80 to 15 percent of the other monomers can be one or more of styrene monomer, or derivatives of styrene monomer or, butadiene monomer, or alkyl methacrylate monomers. Non-limiting examples include poly(styrene-co-acrylonitrile) (SAN) polymers, poly(styrene-co-acrylonitrile-co-butadiene) (ABS) polymers, or acrylic-styrene-acrylonitrile (ASA) polymers.

Suitable materials for the polar polymer also include styrenic copolymers comprising at least one polar monomer (including SAN, ABS, MABS, ASA) and acrylic polymers, copolymers, terpolymers, blends and modified styrenic polymers or acrylic polymers. Styrenic copolymers having at least one polar monomer incorporated therein, as used herein, include but are not limited to, acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoprene copolymers, styrene-isoprene-styrene (SIS) block copolymers and their partially or fully hydrogenated derivatives, styrene-(meth)acrylate copolymers such as styrene-methyl methacrylate copolymers (S/MMA), and mixtures thereof. A preferred styrenic polymer is ASA. Styrenic copolymers useful in the capstock layer of the invention may have a styrene monomer content of at least 10 percent by weight, preferably at least 25 percent by weight. The polymers to be used in the invention can be manufactured by any means known in the art, including emulsion polymerization, solution polymerization, and suspension polymerization. Styrenic copolymers to be employed in the invention may have a styrene content of at least 10 percent by weight, preferably at least 25 percent by weight.

In one embodiment, the capstock layer polymer has a weight average molecular weight of between 50,000 and 500,000 g/mol, and preferably from 75,000 and 150,000 g/mol, as measured by gel permeation chromatography (GPC). The molecular weight distribution of the acrylic polymer may be monomodal, or multimodal with a polydispersity index greater than 1.5.

Fluoropolymers and copolymers are also suitable to use as the capstock layer polymer that is blended with the gloss improving additive. Non-limiting examples include polyvinylidene fluoride (PVDF) as well as fluoropolymers comprising at least 60 weight percent of one or more fluoromonomers. The term "fluoromonomer" or the expression "fluorinated monomer" means a polymerizable alkene which contains in its structure at least one fluorine atom, fluoroalkyl group, or fluoroalkoxy group whereby those groups are attached to the double bond of the alkene which undergoes polymerization. The term "fluoropolymer" means a polymer formed by the polymerization of at least one fluoromonomer, and it is inclusive of homopolymers and copolymers, and both thermoplastic and thermoset polymers. Useful fluoropolymers for use in the capstock layer of the multilayered composite structure of the invention, include, but are not limited to polyvinylidene fluoride (PVDF), ethylene tetrafluoroethylene (ETFE) polymers, terpolymers of ethylene with tetrafluoroethylene and hexafluoropropylene (EFEP), terpolymers of tetrafluoroethylene-hexafluoropropylene-vinyl fluoride (THV), polyvinylfluoride (PVF), copolymers of vinyl fluoride, and blends of PVDF with functionalized or unfunctionalized polymethyl methacrylate polymers and copolymers. The fluoropolymers may be functionalized or unfunctionalized, and could be homopolymers or copolymers—preferably copolymers with other fluorine monomers including vinyl fluoride; vinylidene fluoride (VDF); trifluoroethylene (VF3); chlorotrifluoroethylene (CTFE); 1,2-difluoroethylene; tetrafluoro ethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD), and blends thereof.

In one embodiment of the invention, the fluoropolymer is a copolymer of vinylidene fluoride and hexafluoropropylene.

In one embodiment of the invention, the blend of the polymer used in the capstock layer could be an intimate blend of two polymers, such as in an acrylic modified fluoropolymer (AMF) in which (meth)acrylate monomers are polymerized in the presence of a fluoropolymer seed.

The capstock layer may contain more than 50 weight percent of fluoropolymer, preferably more than 60 weight percent fluoropolymer, more preferably more than 75 weight percent fluoropolymer, and up to and including 100 weight percent of fluoropolymer, based on the weight of polymer in the capstock layer. The fluoropolymer-rich capstock layer may contain from 0 to 49 weight percent, preferably 1 to 35 weight percent, and more preferably 5 to 30 weight percent of one or more acrylic polymers. In a preferred embodiment, the fluoropolymer is a polyvinylidene fluoride homopolymer, or a copolymer of 70-99 weight percent of vinylidene fluoride units and 1 to 30 weight percent of hexafluoropropylene units.

The polar polymers which are combined with the gloss improving additive can be manufactured by any means known in the art, including but not limited to, bulk, solution, suspension, emulsion and inverse emulsion processes as well as free-radical polymerization.

In one embodiment, the capstock polymers described herein have a weight average molecular weight of between 50,000 and 500,000 g/mol, and preferably from 75,000 and 150,000 g/mol, as measured by gel permeation chromatography (GPC). The molecular weight distribution of the polar capstock polymer may be monomodal, or multimodal with a polydispersity index greater than 1.5.

It is also envisioned that the invention can be practiced using polar thermoset (crosslinked) and thermoplastic resin capstocks as the outer cap layer that comprises the gloss improving additive.

The invention may also include copolymers of methyl methacrylate monomer with any of acrylic acid, methacrylic acid and anhydride comonomers as the polar polymer.

The acrylic polymers and other polar polymers can also be blended with other polymers to form blends to modify their properties. The acrylic or other polar polymers may also comprise additives to modify their properties. Examples include, but are not limited to polymers comprising impact modifiers (impact improving additives), block copolymers (including, for example, the block copolymers sold under the brand name Nanostrength® from Arkema), fillers, and other additives. Recycled polymers of any the types listed above are also suitable in the practice of the invention. Embodiments may also include blends in any proportion of the polar polymers listed above, especially the acrylic polymers, styrenic polymers and acrylonitrile polymers listed above.

Substrate or Inner Layer

The substrate layer can have a thickness from 5 mil to more than 10 cm, 10 mil to more than 10 cm, preferably from 50 mil to more than 10 cm, and more preferably from 100 mil to more than 10 cm. The substrate layer of the multilayer composite structure may be thermoplastic or thermoset and may be a composite.

Thermoplastics useful in the present invention as a substrate layer, include but are not limited to acrylic polymers, styrenic polymers, polyolefins, polyvinyl chlorides (PVC), polycarbonates (PC), polyurethanes (PU), or mixtures thereof.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isoprene copolymers styrene-isoprene-styrene (SIS) block copolymers and their partially or fully hydrogenated derivatives, styrene-(meth)acrylate copolymers such as styrene-methyl methacrylate copolymers (S/MMA), and mixtures thereof. A preferred styrenic polymer is ASA. Styrenic copolymers of the invention have a styrene monomer content of at least 10 percent by weight, preferably at least 25 percent by weight.

Acrylic polymers, as used herein, include but are not limited to, homopolymers, random and block copolymers and terpolymers comprising alkyl methacrylates.

The alkyl methacrylate monomer is preferably methyl methacrylate, which may make up from 60 to 100 percent by weight of the monomer mixture. Zero to 40 percent by weight of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can also be useful for the monomer mixture. Small levels of multifunctional monomers as cross-linking agents may also be used. A preferred acrylic polymer is a copolymer of methyl methacrylate and 2-16 percent by weight of one or more C1-4 acrylates.

Polyvinyl chloride (PVC) substrate polymers include polyvinyl chloride, chlorinated PVC, foamed or expanded PVC, filled PVC, including PVC or expanded PVC filled at 0.1 to 80 weight percent with fillers, including but not limited to cellulosic fibers, calcium carbonate, rosin, limestone, aluminum trihydrate, quartz, zinc oxide and silica.

The thermoplastic polymers that are useful in the substrate layer in aspects of the present invention can be manufactured by any means known in the art, including emulsion polymerization, solution polymerization, and suspension polymerization. In one embodiment, the thermoplastic substrate polymer has a weight average molecular weight of between 50,000 and 500,000 g/mol, and preferably from 75,000 and 150,000 g/mol, as measured by gel permeation chromatography (GPC). The molecular weight distribution of the thermoplastic matrix may be monomodal, or multimodal with a polydispersity index greater than 1.5.

Styrenic copolymers as used herein, include but are not limited to, acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoprene copolymers, styrene-isoprene-styrene (SIS) block copolymers and their partially or fully hydrogenated derivatives, styrene-(meth)acrylate copolymers such as styrene-methyl methacrylate copolymers (S/MMA), and mixtures thereof. A preferred styrenic polymer is ASA. Styrenic copolymers of the invention have a styrene monomer content of at least 10 percent by weight, preferably at least 25 percent by weight. The polymers of the invention can be manufactured by any means known in the art, including emulsion polymerization, solution polymerization, and suspension polymerization. Styrenic copolymers useful in the invention may have a styrene content of at least 10 percent by weight, preferably at least 25 percent by weight.

HIPS as used herein is meant to include polystyrene compounds that contain polybutadiene rubber.

The styrenic polymers can also be blended with other polymers to form compatible blends. Non-limiting examples include ASA blended with PVC, and SAN blended with PMMA.

Especially preferred thermoplastics for the substrate are styrenic polymers (including SAN, ABS, MABS, ASA, HIPS), acrylic polymers and PVC.

It is also anticipated that the invention will also work with thermoset plastic substrates, though they are often not as useful as thermoplastic substrates in many applications.

Other suitable substrates include wood/polymer composite, pultruded polyurethane, pultruded polyester, or high-impact polystyrene (HIPS).

Optional Tie Layer

The multilayer composite structure may also comprise an optional tie layer to enhance adhesion between the outer polymer-based capstock layer that comprises the gloss improving additive as described above and the inner substrate layer. Materials useful as a tie layer include but are not limited to functionalized polyolefins such as ethylene/acrylic ester/maleic anhydride copolymer and ethylene/acrylic acid/glycidyl methacrylate copolymer; styrenic copolymers (including, for example, the styrenic copolymers sold under the brand name Tacryl®, from Arkema); polyamides, or polyamide copolymers.

The optional tie layer can have, for example, a thickness of from 0.25 mil to 10 mil.

Surface Treatments

Surface treatments such as are commonly known in the art to improve adhesion to polymers may also be utilized in the practice of this invention in making a multilayer composite structure. Non-limiting examples include corona treatment or plasma treatment or chemical treatment or the use of solvents and cleansing agents to prepare surfaces of the individual layers to be adhered together to form the multilayer composite structure.

Impact Improving Additives

The polar polymer cap layer may include, in addition to the gloss improving additives described herein (which may also have impact modifying properties), impact improving additives (impact modifiers) at, for example, levels of from 20-60 weight percent based on the polar polymer matrix. Useful impact modifiers include linear block copolymers, and preferably core shell polymers, as known in the art. Polybutadiene rubber is a suitable impact modifier. Hardcore, core-shell impact modifiers are especially preferred.

Other Additives

Any additives that are known in the art are suitable for use in the any or all of the layers of the multilayer composite structure described herein. Non-limiting examples of such additives include fillers, surface modifying additives, antioxidants, gloss improving additives, UV screens and processing aids.

Non-limiting examples of suitable fillers or surface modifying ingredients include calcium carbonate, gypsum and flax fibers. Coloring agents may be used in any of the polymers and layers described herein. The above polymer-based capstock and substrate layers may contain one or more impact modifiers (impact improving additives), fillers or fibers, or other additives of the type used in the polymer art. Examples of impact modifiers include, but are not limited to, core-shell particles and block or graft copolymers. Examples of additives include, for example, UV light inhibitors or stabilizers, lubricant agents, heat stabilizers, flame retardants, synergists, pigments, toners and other coloring agents. Examples of fillers employed in a typical compounded polymer blend according to the present invention include talc, calcium carbonate, mica, matting agents, wollastonite, dolomite, glass fibers, boron fibers, carbon fibers, carbon blacks, pigments such as titanium dioxide, or mixtures thereof. Other polymer additives could include polycarbonates, polyurethanes, polysulfones, polyamides, polyolefins including copolymers and terpolymers based on these polymers, and including linear, branched, block, and grafted polymer structures. Examples of matting agents include, but are not limited to, cross-linked polymer particles of various geometries. The amount of filler and additives included in the polymer compositions of each layer may vary from about 0.01% to about 70% of the combined weight of polymer, additives and filler. Generally, amounts from about 5% to about 45%, from about 10% to about 40%, are included.

The fillers may be treated with coupling agents to improve the bond between the fillers to the resin. For example, the fillers can be treated with materials such as fatty acids (e.g., stearic acid), silanes, maleated polypropylene, etc. The amount of coupling agent used is an amount effective to improve the bond between the fillers with the resin. Also suitable to use in any of the layers of the composites described herein include acrylic beads or ground acrylic. Standard acrylic polymers are suitable for either beads or ground, and especially preferred are crosslinked versions of acrylic beads or ground acrylics.

Antioxidants as are commonly known in the art are suitable to add to the polymers described herein at any suitable level. Non-limiting examples include sterically hindered phenols, organophosphites and amines.

Additives as are commonly known in the art to improve and enhance UV stability are suitable to use at any suitable level in any of the layers for the multilayer composite structure. Non-limiting examples include hindered amine light stabilizers (HALS), benzotriazoles, triazines, benzophenones, and cyanoacrylates.

Gloss improving additives as are known in the art, in addition to the gloss improving additive described herein may also be using in the outer capstock layer. Mention may be made of nanoparticles such as silica and zinc oxide as especially useful additional gloss and scratch resistance-improving additives.

Processing and Manufacturing Methods

Methods of making the multilayer composite structures described herein may be typical such methods as are known in the industry.

The following is a non-limiting list of common polymer processing methods that may be employed in making the multilayer composite structures utilizing as a capstock layer a polar polymer in combination with a gloss improving additive in accordance with the present invention.

Co-extrusion is a process in which two or more different molten polymeric compositions are simultaneously extruded through a feedblock die or, alternatively, through a multi-manifold die, to form a laminar structure with different functional properties in each layer. A feedblock die can be used to feed a multi-manifold die in a single process, to provide excellent flexibility in the manufacture of the multilayer structures. Lamination is the process of bonding together prefabricated sheet layers, or prefabricated and extruded sheet layers, by the use of adhesives, and/or by a combination of heat and pressure. Alternatively, hot melt lamination or thermal lamination brings two or more molten polymer layers together outside the extrusion die, usually at a nip roll or at the top roll of a roll stack. Other non-limiting examples of polymer processes include: extrusion-lamination wherein two separate layers are extruded in parallel and hot rolled together in a continuous process, insert molding, multi-shot injection molding, compression molding, pultrusion, multilayer blown film, thermoforming, vacuum forming, injection blow molding, blow molding, and rotamolding.

The multilayer composite structure of the invention can contain two or more layers, with the choice of the number and composition of the layers being adjusted to meet the needs of the end-use application. The structure can be made by any method known to the art. This includes separate formation of the layers followed by lamination, co-extrusion of all layers or a combination of co-extrusion and lamination or any of the processes mentioned herein.

The multilayer composite material described herein can be manufactured as a generally planar structure. The generally planar multilayer composite structure of the present invention may be further shaped into a three-dimensional part by any suitable method. Thermoforming, for example, is the process of heating a plastic material in sheet form to its particular processing temperature and forming the hot and flexible material against the contours of a mold by mechanical or pneumatic means.

The multilayer composite structure can have any given geometry, including but not limited to, a flat sheet, a rod, or a profile. The multilayer composite structure exhibits excellent structural integrity, excellent surface appearance, high impact strength, high scratch resistance, and excellent resistance to UV rays.

The multilayer composite structure is intended in general to be thick enough to be a rigid, or fairly rigid, or non-flexible, or low-flexibility structure. The multilayer composite material can be as thick as 4 cm, or even thicker if needed for a particular application. Therefore, the multilayer composite structure is suitable for structural purposes, such as for example exterior siding, decking material, roofing material, shower inserts, kitchen counters, furniture for outside or inside use, or other such non-limiting uses as are well-known in the art.

In the multilayered composite structure of this invention, the substrate layer is preferably from 10 mil to more than 10 cm thick, preferably from 50 mil to more than 10 cm thick, and more preferably from 100 mil to more than 10 cm thick. The outer capstock polymer layer of the multilayered structure is preferably from 1 mil to 100 mil thick, preferably from 3 mil to 25 mil thick and more preferably from 4 mil to 20 mil thick.

The optional tie layer of the multilayer composite structure is preferably 0.25 mil to 10 mil thick.

In one embodiment, the multilayer composite structure of the invention comprises at least one capstock polymer outer layer that is blended with the gloss improving additive as described above and at least one inner substrate layer that is in direct contact with the outer capstock layer. In another embodiment, the multilayer composite structure comprises three layers in which the inner substrate layer is in direct contact with two outer polymer capstock layers, wherein one of the capstock layers is on one side of the substrate layer and the other capstock layer is on the other side of the substrate layer.

In still another embodiment, the multilayer composite structure further comprises at least one tie layer disposed between the outer capstock polymer layer and the inner substrate layer.

In one embodiment, the multilayer structure of the invention contains two or more polymer layers, and one or more tie layers, such as a five-layer structure of capstock polymer/tie layer/polyester-based polymer/tie layer/capstock polymer. A four-layer structure is also contemplated: capstock polymer/tie layer/substrate polymer/capstock polymer.

In a structure in which multiple capstock polymer layers and/or multiple tie layers are used in layers non-adjacent to each other, each of the polymer-based layers and tie layers can be of the same or of different compositions, though in a preferred embodiment each of the multiple polymer-based layers are the same and each of the multiple tie layers are the same. In another embodiment, the tie layer may be comprised of two or more tie layers directly in contact with each other.

Testing

Impact resistance or impact strength is measured using the Gardner Impact Text (GIT) with conical tips. ASTM D4226 (2009). The results are reported as Mean Failure Energy (MFE) impact strength in units of in-lb/mil.

Gloss is measured using a BYK Gardner Micro-Gloss 75 degree Gloss Meter and a BYK Gardner Micro-Tri-Gloss 20/60/85 degree Gloss Meter. The measurement unit conforms to the standards DIN 67530, ISO 2813, ASTM D 523 and BS 3900 Part D 5. Gloss is measured at 75 degrees and/or 60 degrees. In general, the surface gloss is measured immediately after extrusion.

Decomposition temperature is measured by thermal gravimetric analysis, according to the following procedure: Specimens were weighed, inserted into aluminum hermetic pans and then heated at 20° C./min to 600° C. in air. The mass loss as a function of temperature is recorded. Thus, the temperatures at which 5 percent and 10 percent of the initial mass are lost can be reported.

EXAMPLES

Example 1: Capstock Layer Blends

The following capstock layer polymer blends were prepared, each comprising a different gloss improving additive according to the invention. A comparative polymer blend, not comprising the gloss improving additive, was also prepared. These capstock formulations are shown in Table 1:

TABLE 1

| | Capstock Layer Formulations (weight percent) | | | |
|---|---|---|---|---|
| Ingredient | Composition 1 (invention) | Composition 2 (invention) | Composition 3 (invention) | Composition A (comparative) |
| Acrylic polymer blend | 93 | 93 | 93 | 95 |
| 1,2 dihydroxy alkanes blend Vikinol® 18 and Vikinol® 20/24 (Arkema) | 2.00 | — | 2.00 | — |
| Soy Polyol-Polyol polyester (Arkema) | — | 2.00 | — | — |
| Colorant | 5.00 | 5.00 | 5.00 | 5.00 |

These acrylic blend cap layer formulations were prepared by melt blending the components shown above in Table 1 in a twin-screw extruder operating at 300-425 revolutions per minute (RPM) and the extruder temperature profile shown below in Table 2.

TABLE 2

| Melt blending extruder temperature profile | | | | | | | | | |
|---|---|---|---|---|---|---|---|---|---|
| Zone 1 | Zone 2 | Zone 3 | Zone 4 | Zone 5 | Zone 6 | Zone 7 | Zone 8 | Zone 9 | Die |
| 100° C. | 132° C. | 151° C. | 220° C. | 220° C. | 220° C. | 222° C. | 220° C. | 230° C. | 260° C. |

Example 2: Composite Structures

The acrylic cap stock blends made according to Example 1 were co-extruded over a PVC substrate with a custom made 1"×4" die and two extruders: a substrate layer extruder and a capstock layer extruder.

The PVC substrate extruder was a single screw extruder operating at 9 revolutions per minute (RPM) with barrel temperature profile of 168° C. (feed end) to 182° C. (die end).

The acrylic blend cap stock layer extruder was a single-screw extruder with barrel temperature profile of 170° C. (feed) to 210° C. (die end). The co-extrusion die temperature for the profile was set at 165° C. and 200° C.

Gloss and impact measurements were taken on the finished profiles made at 165° C. and 200° C. die temperatures for each of the capstock compositions made according to Example 1.

The results are shown below in Table 3 for cap stock layer thicknesses between 0.006" and 0.007" and an overall part thickness of 0.062"-0.072".

TABLE 3

Gloss and impact results for extruded profile with gloss improvement additives.

| | 60° Gloss | 75° Gloss | Impact (in-lbs/mil) | Die temperature |
|---|---|---|---|---|
| Composition 1 | 21.8 | 66.8 | 1.07 | 200° C. |
| Composition 2 | 15.1 | 59.7 | 0.77 | 200° C. |
| Composition 3 | 13.0 | 52.9 | 1.11 | 200° C. |
| Composition A | 10.9 | 49.6 | 0.68 | 200° C. |

It is clear from these results that the addition of the 1,2 dihydroxy alkanes blend and the Soy Polyol-polyol polyester significantly improved both the gloss and the impact strength of the cap layer of the extruded profile. Further, addition of the 1,2 dihydroxy alkanes blend and the Soy Polyol-polyol polyester widened the temperature processing window (detailed below in Example 3) for the capstock layer, so that the cap layer could be extruded at a higher temperature, which also improved the gloss as well as the surface appearance of the capstock layer.

Example 3: Decomposition Temperature of Blends Comprising the Gloss Improving Additive The thermal decomposition temperature is a convenient way to determine the thermal operating window for extrusion of plastics, in that it provides guidance on how hot a material may be extruded before it starts to degrade.

The thermal decomposition temperature of capstock layer blends Composition 1 and Composition A made according to Example 1, were measured and compared. The results are shown below in Table 4.

TABLE 4

| Decomposition temperatures | | |
|---|---|---|
| Sample | 5% Mass Loss Temperature (° C.) | 10% Mass Loss Temperature (° C.) |
| Composition A | 295.9 | 305.5 |
| | 297.9 | 309.8 |
| Composition 2 | 304.3 | 316.2 |
| | 306.5 | 319.8 |

It is clear from these results that addition of the polyol polyester raised the decomposition temperature of the acrylic capstock by approximately 10° C. As discussed above, this effect also serves to widen the processing temperature window of these materials, so that improved gloss can be achieved by extrusion at higher temperatures, without degradation of the polymer. It is also significant that the addition of the polyols did not degrade the adhesion between the cap stock layer and the substrate layer, as might be expected.

Example 4: Capstock Layer Additive Content

The following capstock layer polymer blends were prepared, each comprising a different level of gloss improving additive according to the invention. A comparative polymer blend, not comprising the gloss improving additive, was also prepared. These capstock formulations are shown in Table 5:

TABLE 5

Capstock Layer Formulations (weight percent)

| Ingredient | Composition 4 (invention) | Composition 5 (invention) | Composition 6 (invention) | Composition B (comparative) |
|---|---|---|---|---|
| Acrylic polymer blend | 95.52 | 94.28 | 91.8 | 96.68 |
| Soy Polyol-Polyol polyester (Arkema) | 2.48 | 3.72 | 6.2 | — |
| Colorant | 2.00 | 2.00 | 2.00 | 3.32 |
| 60° Gloss | 13 | 24 | 26 | 11 |

These acrylic blend cap layer formulations were prepared by melt blending the components shown above in Table 5 using the same conditions as Example 1.

The acrylic cap stock blends made were co-extruded over a PVC substrate with a custom made 1"×4" die and two extruders: a substrate layer extruder and a capstock layer extruder.

The PVC substrate extruder was a single screw extruder operating at 8 revolutions per minute (RPM) with barrel temperature profile of 168° C. (feed end) to 182° C. (die end).

The acrylic blend cap stock layer extruder was a single-screw extruder with barrel temperature profile of 187° C.

(feed) to 210° C. (die end). The co-extrusion die temperature for the profile was set at 168° C. and 185° C.

Gloss were taken on the finished profiles made at 185° C. die temperatures for each of the capstock compositions made. The results shown in Table 5 are for cap stock layer thicknesses between 0.007" and 0.009". It is clear from these results that the addition of the Soy Polyol-polyol polyester significantly improved both the gloss of the cap layer of the extruded profile.

Various exemplary aspects of the present invention may be summarized as follows:

A composition comprising at least one polar polymer and at least one gloss improving additive having a molecular weight above 200 grams per mole is disclosed. The gloss improving additive is at least one of: a functionalized straight chain alkane, a functionalized branched alkane, a functionalized fatty acid ester, or a mixture of any of these. The gloss improving additive may have at least one of these functional groups: vicinal diol, hydroxy phosphotriester, hydroxy ester, hydroxy ether, hydroxy amino, hydroxy sulfide, hydroxy nitrile, hydroxy amine, terminal alcohol, thiiran, ketone and cyclic carbonate.

The straight chain or branched hydroxyalkane can have at least one vicinal diol group. This straight chain or branched hydroxyalkane may be a 1,2-dihydroxy alkane.

The composition can include as the gloss improving additive at least one fatty acid ester having a weight average molecular weight above 200 grams per mole. This fatty acid ester may comprise at least two hydroxyl groups and can be derived from a vegetable or animal oil. The fatty acid ester having at least two hydroxyl groups derived from a vegetable or animal oil can be synthesized as the reaction product of an epoxidized vegetable or animal oil with at least one of an aqueous acid or an aqueous base.

The epoxidized vegetable or animal oil may be one of or a mixture of any of the following: epoxidized algae oil, epoxidized canola oil, epoxidized coconut oil, epoxidized castor oil, epoxidized corn oil, epoxidized cottonseed oil, epoxidized flax oil, epoxidized fish oil, epoxidized grapeseed oil, epoxidized hemp oil, epoxidized jatropha oil, epoxidized jojoba oil, epoxidized mustard oil, epoxidized canola oil, epoxidized palm oil, epoxidized palm stearin, epoxidized rapeseed oil, epoxidized safflower oil, epoxidized soybean oil, epoxidized sunflower oil, epoxidized tall oil, epoxidized olive oil, epoxidized tallow, epoxidized lard, epoxidized chicken fat, epoxidized linseed oil, epoxidized tung oil, epoxidized linseed oil.

The composition can contain between 2 and 40 weight percent of the gloss modifying additive, based on the weight of the polar polymer.

The composition can have a 75 degree gloss greater than 53, as measured using a BYK Gardner Micro-Gloss 75 degree Gloss Meter. The composition may alternatively, or in addition, have a 60 degree gloss greater than 12, as measured using a BYK Gardner Micro-Tri-Gloss 20/60/85 degree Gloss Meter.

Further, the composition may contain an impact improving additive. Suitable such additives are: linear block copolymers, core shell polymers, and mixtures thereof. Useful levels of this impact improving additive are between 20 and 60 weight percent, based on the weight of the polar polymer.

The polar polymer can be at least one of: acrylic polymers, acrylonitrile polymers, polyvinyl chlorides (PVC), polycarbonates (PC), polyurethanes (PU), thermoplastic polyurethanes (TPU), polyesters, polyethylene terephthalate (PET), polyethylene naphthalate (PEN), polybutylene terephthalate (PBT), glycol-modified polyester (PETG), fluoropolymers, or copolymers thereof, or mixtures of these polymers. Advantageously, the polar polymer is an acrylic polymer or acrylonitrile polymer. These polymers can be homopolymers, co-polymers, terpolymers or a mixture. Suitable monomers are: methyl methacrylate, methyl acrylate, ethyl acrylate, ethyl methacrylate, butyl acrylate, butyl methacrylate, iso-octyl methacrylate, iso-octyl acrylate, lauryl acrylate, lauryl methacrylate, stearyl acrylate, stearyl methacrylate, isobornyl acrylate, isobornyl methacrylate, methoxy ethyl acrylate, methoxy ethyl methacrylate, 2-ethoxy ethyl acrylate, 2-ethoxy ethyl methacrylate, dimethylamino ethyl acrylate, dimethylamino ethyl methacrylate, acrylonitrile, vinyl cyanide compounds, polar derivatives of styrene, as well as mixtures of these monomers. The polar polymer may advantageously be an acrylic polymer that is a copolymer of methyl methacrylate and 2 to 16 percent by weight of one or more C1-C4 acrylates.

Also disclosed is a multilayer composite structure that has at least one capstock layer and at least one substrate layer. The multilayer composite structure has an outer layer and an inner layer, and the outer layer has an external surface. The capstock layer is the outer layer and the substrate layer is the inner layer. The capstock layer is made of at least one polar polymer which incorporates at least one gloss improving additive that has a molecular weight above 200 grams per mole. This gloss improving additive is at least one of: functionalized straight chain alkanes, functionalized branched alkanes, functionalized fatty acid esters and mixtures thereof. Functional groups on the gloss improving additive may be at least one of: vicinal diol, hydroxy phosphotriester, hydroxy ester, hydroxy ether, hydroxy amino, hydroxy sulfide, hydroxy nitrile, hydroxy amine, terminal alcohol, thiiran, ketone, and/or cyclic carbonate. Suitable substrate layers in the composite structure are: acrylic polymers, styrenic polymers, polyolefins, polyvinyl chlorides (PVC), polycarbonates (PC), polyurethanes (PU), styrene-acrylonitrile (SAN) copolymers, acrylonitrile butadiene styrene (ABS) polymers, methylmethacrylate acrylonitrile butadiene styrene (MABS) copolymers, acrylonitrile styrene acrylate (ASA) copolymers, high-impact polystyrenes (HIPS), wood/polymer composites, polyesters, or mixtures of any of these materials.

The capstock layer has a 75 degree gloss of at least 53, as measured using a BYK Gardner Micro-Gloss 75 degree Gloss Meter. In addition, or alternatively, the capstock layer has a 60 degree gloss of 12 or greater, as measured using a BYK Gardner Micro-Tri-Gloss 20/60/85 degree Gloss Meter.

The capstock layer has a mean fracture energy (MFE) impact strength of at least 0.7 in-lb/mil, as measured by the Gardner Impact Test with conical tip.

Disclosed herein is a composition comprising at least one polar polymer and at least one gloss improving additive. The gloss improving additive is at least one of: hydroxyalkanes comprising at least two hydroxyl groups and having a molecular weight above 200 grams per mole, polyol polyesters comprising at least two hydroxyl groups and having a molecular weight above 200 grams per mole, and/or mixtures of these compounds.

In some embodiments, the invention herein can be construed as excluding any element that does not materially affect the basic and novel characteristics of the composition or process. Additionally, in some embodiments, the invention can be construed as excluding any element not specified herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A composition comprising:
   a) at least one polar polymer;
   b) between 2 and 40 weight % based on the weight of the at least one polar polymer of at least one gloss improving additive having a molecular weight above 200 grams per mole,
   wherein the at least one gloss improving additive comprises at least one straight chain or branched hydroxyalkane comprising at least one vicinal diol group, and
   wherein the at least one polar polymer is an acrylic polymer blend composed of a copolymer of methyl methacrylate and 2 to 16 weight % of one or more C1-C4 acrylates.

2. The composition according to claim 1, wherein the at least one straight chain or branched hydroxyalkane is a 1,2-dihydroxy alkane.

3. The composition according to claim 1, wherein the composition further comprises at least one fatty acid ester having a weight average molecular weight above 200 grams per mole and comprising at least two hydroxyl groups, wherein the fatty acid ester is derived from a vegetable or animal oil.

4. The composition according to claim 3, wherein the fatty acid ester comprising at least two hydroxyl groups derived from a vegetable or animal oil is a reaction product of an epoxidized vegetable or animal oil with at least one of an aqueous acid or an aqueous base.

5. The composition according to claim 4 wherein the epoxidized vegetable or animal oil is selected from the group consisting of epoxidized algae oil, epoxidized canola oil, epoxidized coconut oil, epoxidized castor oil, epoxidized corn oil, epoxidized cottonseed oil, epoxidized flax oil, epoxidized fish oil, epoxidized grapeseed oil, epoxidized hemp oil, epoxidized jatropha oil, epoxidized jojoba oil, epoxidized mustard oil, epoxidized canola oil, epoxidized palm oil, epoxidized palm stearin, epoxidized rapeseed oil, epoxidized safflower oil, epoxidized soybean oil, epoxidized sunflower oil, epoxidized tall oil, epoxidized olive oil, epoxidized tallow, epoxidized lard, epoxidized chicken fat, epoxidized linseed oil, epoxidized tung oil, epoxidized linseed oil, and mixtures thereof.

6. The composition according to claim 1, wherein the composition has a 75 degree gloss as measured using a BYK Gardner Micro-Gloss 75 degree Gloss Meter and a 60 degree gloss as measured using a BYK Gardner Micro-Tri-Gloss 20/60/85 degree Gloss Meter, wherein the 75 degree gloss is 53 or greater and the 60 degree gloss is 12 or greater.

7. The composition according to claim 1, further comprising an impact improving additive.

8. The composition according to claim 7, wherein the impact improving additive is selected from the group consisting of linear block copolymers, core shell polymers, and mixtures thereof.

9. The composition according to claim 8, wherein the composition is comprised of between 20 and 60 weight percent of the impact improving additive, based on the weight of the polar polymer.

10. A multilayer composite structure comprising:
    a) at least one capstock layer comprising the composition according to claim 1; and
    b) at least one substrate layer,
    wherein the multilayer composite structure comprises an outer layer and an inner layer, wherein the outer layer has an external surface, and wherein the capstock layer is the outer layer and the substrate layer is the inner layer.

11. The multilayer composite structure according to claim 10, wherein the substrate layer comprises at least one polymer selected from acrylic polymers, styrenic polymers, polyolefins, polyvinyl chlorides (PVC), polycarbonates (PC), polyurethanes (PU), styrene-acrylonitrile (SAN) copolymers, acrylonitrile butadiene styrene (ABS) polymers, methylmethacrylate acrylonitrile butadiene styrene (MABS) copolymers, acrylonitrile styrene acrylate (ASA) copolymers, high-impact polystyrenes (HIPS), wood/polymer composites, polyesters, or mixtures thereof.

12. The multilayer composite structure according to claim 10, wherein the capstock layer has a 75 degree gloss as measured using a BYK Gardner Micro-Gloss 75 degree Gloss Meter and a 60 degree gloss as measured using a BYK Gardner Micro-Tri-Gloss 20/60/85 degree Gloss Meter, wherein the 75 degree gloss is 53 or greater and the 60 degree gloss is 12 or greater.

13. The multilayer composite structure according to claim 10, wherein the capstock layer has a mean fracture energy (MFE) impact strength measured by the Gardner Impact Test with conical tip and wherein the MFE impact strength is at least 0.7 in-lb/mil.

* * * * *